US007756682B1

(12) United States Patent
Pebay et al.

(10) Patent No.: US 7,756,682 B1
(45) Date of Patent: Jul. 13, 2010

(54) SYSTEM AND METHOD FOR STATISTICALLY MONITORING AND ANALYZING SENSED CONDITIONS

(75) Inventors: Philippe P. Pebay, Livermore, CA (US); James M. Brandt, Dublin, CA (US); Ann C. Gentile, Dublin, CA (US); Youssef M. Marzouk, Oakland, CA (US); Darrian J. Hale, San Jose, CA (US); David C. Thompson, Livermore, CA (US)

(73) Assignee: Sandia Corporationed, Livermore, CA (US)

( * ) Notice: Subject to any disclaimer, the term of this patent is extended or adjusted under 35 U.S.C. 154(b) by 855 days.

(21) Appl. No.: 11/526,283

(22) Filed: Sep. 21, 2006

(51) Int. Cl.
*G06N 5/00* (2006.01)
(52) U.S. Cl. .................................. 702/187
(58) Field of Classification Search .................. 702/187
See application file for complete search history.

(56) References Cited

U.S. PATENT DOCUMENTS

2003/0059081 A1* 3/2003 Trajkovic ................. 382/100

2004/0250166 A1* 12/2004 Dahlquist et al. ............. 714/37

OTHER PUBLICATIONS

Brandt, J. M.; Gentile, A. C.; Hale, D. J.; and Pebay, P. P.; "OVIS: A Tool for Intelligent, Real-time Monitoring of Computational Clusters," *Proceedings of the IEEE, 20th International Parallel and Distributed Processing Symposium*, Apr. 2006, 8 pages.
Tråvén, Hans G.C.; "A Neural Network Approach to Statistical Pattern Classification . . . " IEEE Transactions on Networks, 1991, v.2(3): pp. 366-377.

* cited by examiner

*Primary Examiner*—Tung S Lau
(74) *Attorney, Agent, or Firm*—Timothy P. Evans

(57) ABSTRACT

A system and method of monitoring and analyzing a plurality of attributes for an alarm condition is disclosed. The attributes are processed and/or unprocessed values of sensed conditions of a collection of a statistically significant number of statistically similar components subjected to varying environmental conditions. The attribute values are used to compute the normal behaviors of some of the attributes and also used to infer parameters of a set of models. Relative probabilities of some attribute values are then computed and used along with the set of models to determine whether an alarm condition is met. The alarm conditions are used to prevent or reduce the impact of impending failure.

21 Claims, 2 Drawing Sheets

SYSTEM AND METHOD FOR STATISTICALLY MONITORING AND ANALYZING SENSED CONDITIONS

STATEMENT OF GOVERNMENT SUPPORT

The United States Government has a paid-up license in this invention and the right in limited circumstances to require the patent owner to license others on reasonable terms as provided for by the terms of contract DE-AC04-94AL85000 awarded by the U.S. Department of Energy to Sandia Corporation.

CROSS REFERENCE TO RELATED APPLICATIONS

None

TECHNICAL FIELD

This invention relates to monitoring of sensed conditions (e.g. memory error rate, temperature and network errors in a computational cluster) and, more particularly, to a system and method for statistically analyzing a sensed condition of a statistically significant number of statistically similar components using Bayesian inference.

BACKGROUND OF THE INVENTION

A very common problem addressed by electronic systems is the monitoring of a sensed condition, sometimes at a very large number of locations. For example, an entire city may be instrumented with a large number of sensors for sensing radiation or potentially toxic gases at a wide variety of locations. Another example is that the operating condition of electronic devices may be monitored for various operating conditions. This latter example is relevant in computational clusters. Computational clusters have been developed in order to provide a large number of processors to host large computations which include, but are not limited to, the simulation of complex events. These computational clusters can include tens of thousands of system components. These system components include computational nodes, switch ports, network cards, and storage elements. However, despite large numbers of computational nodes, it can require a considerable period of time for the computations to run. In a representative system, each computational node is housed in a rack-mounted chassis, and a large number of racks each containing, for example, 30-50 chassis arranged in rows. An installation having 50,000 processors with 40 processors per rack would thus require 1,250 racks. It would also have 2 or more network switch ports per computational node and 10,000 storage elements (i.e., hard drive spindles). Insofar as the system components in a massively parallel processing system operate together, it is important to be able to determine when one or more of the system components is starting to malfunction, or becomes likely to malfunction, so that a failure does not occur during a complex and lengthy computation or that if it does the failed component can be quickly identified and swapped out.

One technique that has been used to monitor and analyze electronic devices for impending malfunctions is to monitor the values (or additionally processed values) of the operating conditions of the devices and compare those values to pre-determined threshold limits. If values (or processed values) occur that exceed these limits, then it is believed that failure is imminent, and an alarm is given. For example, in the case of computational clusters, one could monitor operating conditions which include processor temperatures, fan speeds, and memory error rates. This is only a small set of operating conditions that can be monitored and is not meant to be an exhaustive list. Sensors produce analog signals that are processed by an analog-to-digital converter in order to produce digital signals indicative of the sensed conditions' values. These values can optionally be additionally processed by intermediate software layers. The raw or processed values are then received by a monitoring device or devices. This monitoring device or devices then compares the values to pre-defined threshold limits, believed to be indicative of impending failure. These limits are typically those determined by the design of the system components considered individually, and not with consideration of their placement in the system and the system's environmental conditions.

It is, however, difficult to set the alarm limits in a manner which catches the cases that will result in failure in a timely manner without providing too many false positives. If the threshold is set too low, then one risks getting an excessive number of warnings to deal with, many of which are not reflective of an impending malfunction but are merely reflective of unlikely, but still normal operating conditions of the monitored system. On the other hand, if the threshold is set high enough to avoid these false positive alarms, then the monitoring system may fail to detect a value indicative of an impending malfunction, or may detect it only when the failure is imminent. In this latter case, though the detection has occurred and can be used to preclude catastrophic failure by shutting down the device immediately, it is useless as a mechanism to drive graceful recovery. For these and other reasons, conventional systems for monitoring computational clusters typically fail to signal impending malfunctions with sufficient time margins to allow any response other than shutting down malfunctioning system components before actual failure occurs.

Although the example discussed above is in the context of monitoring computational clusters, essentially the same problem can exist in any system that monitors a large number of sensors. For example, systems that monitor a large number of locations in a city for radiation, poison gases, nerve agents or other conditions may fail to detect an abnormal sensed condition in a timely manner because of the difficulty in setting optimal alarm limits.

There is, therefore, a need for a monitoring and analysis system that can optimally set alarm limits for a large number of sensors, where these alarms limits are reflective of a reasonable operating range of the monitored system as situated in its environment, as opposed to pre-defined variable value limits.

Doing a statistical analysis on the values of a statistically significant number of statistically similar monitored devices could yield the answer to this problem. However, the problem is further complicated by the characteristics of the monitored devices being modified by the environment in which they are situated. The solution then is to somehow extricate the probabilistic model(s) of the monitored devices from the effects of the environment or to include said effects in said model(s) and then perform said statistical analysis using the results.

SUMMARY OF THE INVENTION

A system and method of monitoring and analyzing a plurality of values of attributes of a system comprised of a statistically significant number of statistically similar components for an alarm condition are disclosed. Attributes whose values are available in statistically significant quantities and for which whose normal behavior is computed are identified hereinafter as "variables."

A probabilistic model is used to account for the components being exposed to and their characteristics being modified by a non-homogeneous but sufficiently well behaved (e.g. continuously varying) environment. The general form of an abstract probabilistic model for the normal behaviors of at least some of the attributes is either created by the user or picked by the monitoring and analysis system from a set of typical models based on a set of imposed constraints. Parameter values for the abstract probabilistic models are inferred using the method of Bayesian inference, wherein the abstract probabilistic model when combined with specific values for all of its parameters is defined as a concrete probabilistic model (or simply "probabilistic model"). If desired, given a set of fit constraints, a best-fit concrete probabilistic model can be selected either by a user or by the monitoring and analysis system. Relative probabilities of the attribute values for which there is a normal behavior are then determined based on the concrete probabilistic model. The term relative probability is used to refer to a numeric indication of where a particular value lies in the probability distribution for that variable. There is no standardized method for calculating this numeric indication and, hence, using a different method may result in a different numeric result given the same variable value. The important thing is consistency. Criteria for one or more alarm conditions can be user supplied and/or calculated using the concrete probabilistic model together with the relative probabilities. The monitoring and analysis system then determines whether an alarm condition is met. The user may then request information about alarm conditions and/or an appropriate response may be generated.

DETAILED DESCRIPTION OF THE PREFERRED EMBODIMENTS

Figure 1:
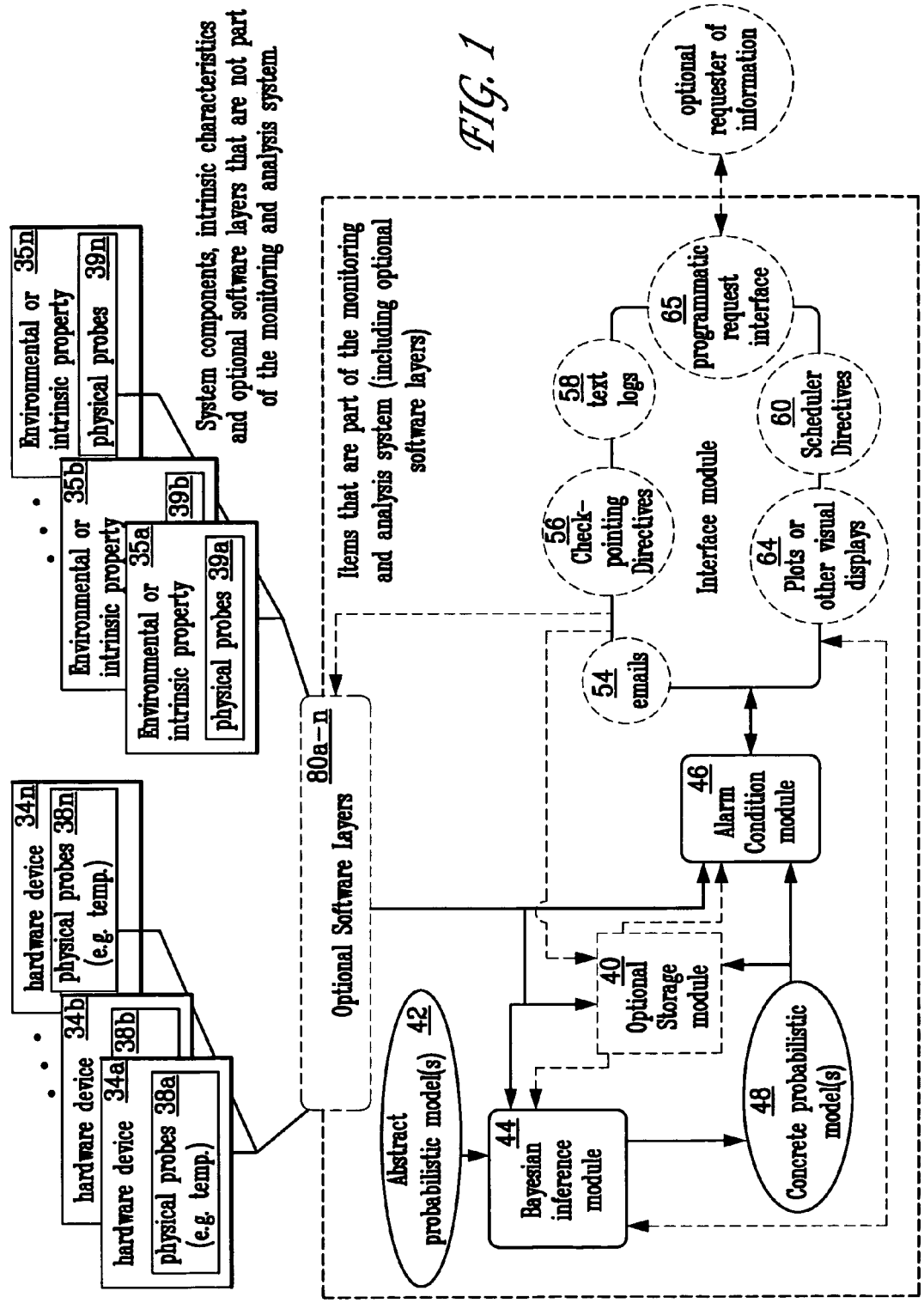
FIG. 1 is a block diagram of a monitoring and analysis system according to one example of the invention.

A monitoring and analysis system according to one example of the invention is shown in FIG. 1. The monitoring and analysis system is used to monitor and analyze values of attributes of the monitored system of a statistically significant number of monitored system components 34 *a-n*. Attributes are quantities of interest in the system being monitored.

An attribute can be associated with each statistically similar component 34 (a component attribute) or associated with the system as a whole (a systemic attribute). Note that a system comprised of a statistically significant number of statistically similar components 34 may have attributes that individual components 34 of the system do not. This is known as emergent behavior. Attribute values may be received from any source but typically originate from sensors 38, manual human input, software measurements, intermediate software layers 80 that perform processing, or storage 40. Values associated with some attributes will be available in statistically significant numbers while others will not. Again, attributes whose values are available in statistically significant quantities and for which normal behavior is computed are named variables, while the remainder are named intrinsic characteristics of components or intrinsic characteristics of the system if they are component attributes or systemic attributes, respectively.

Consider an example where the monitored system is a computational cluster with statistically similar computational nodes, statistically similar switch ports, and statistically similar storage devices. Attributes could include (1) the temperature of the central processing units (CPUs) of each computational node, (2) the height of each computational node in a rack, (3) the number of packets transmitted per second by each switch port, (4) the temperature at several locations in the room containing the computational cluster, and (5) the computational efficiency of the computational cluster. Attributes (1) and (3) are component attributes for which there will be a statistically significant number of values. Attribute (2) is a component attribute which must be an intrinsic characteristic of a component. If the normal behavior of (3) is not computed, then it too is said to be an intrinsic characteristic of a component. Attributes (4) and (5) are systemic attributes; assuming there are not a statistically significant number of values available, they would be named intrinsic characteristics of the system. Note that values for attribute examples (1) and (4) are obtained from sensors, example (2) from manual human input, examples (3) and (5) from software measurements.

Unlike conventional monitors, the monitoring and analysis system of to FIG. 1 does not compare the conditions described by the variable values to predefined variable alarm limit values that are typically defined irrespective of the monitored component's location in the monitored system and the monitored system's environmental conditions. Rather, the monitoring and analysis system uses statistical analysis to identify one or more variable conditions that fall outside of statistical probability limits for those values particular to the system being monitored, taking into account its configuration and environment. More specifically, the monitoring and analysis system probabilistically calculates one or more probabilistic models for the normal behaviors of a statistically significant number of statistically similar monitored components of the monitored system even in the presence of a non-homogeneous but well behaved (e.g. continuously varying) environment which may have dependencies on other such components or on other characteristics intrinsic to the system and/or monitored components (e.g. altitude of the system and relative placements of the monitored components). From this probabilistic model, the monitoring and analysis system calculates relative probabilities of the variable values actually evinced in the monitored system. Alarm criteria, taking into consideration the relative probabilities and the probabilistic model, are used to determine if an alarm condition is met. The monitoring and analysis system provides responses to queries about alarm conditions and/or generates a response to an alarm condition.

Quantities relevant to the monitoring and analysis of the variables of the components of the monitored system are obtained in several ways. Physical probes 38 *a-n* are associated with respective monitored system components 34 *a-n* in a manner that allows the probes 38 to provide an indication of the physical property being monitored. For example, a processor temperature probe may be located on a processor. Multiple physical probes may be associated with a single monitored system component. Alternatively, values of intrinsic characteristics of the to monitored system are provided by measurements of some type indicated by measurement devices 35 *a-n* relating to quantities 39 *a-n*. For example, location of the nodes in the room may be obtained by human measurement; the ambient temperature of the room may be measured by additional sensors. Note that the number of intrinsic characteristics of the monitored system need not be the same as the number of monitored system components or the number of probes. Finally, additional software layers 80 *a-n*, may exist to additionally process the values of the monitored system variables under consideration. For instance, additional software layers 80 may exist to convert the measured raw network counter values into values representing the change in the value of the variable as a function of time, which is the value that the monitoring and analysis system will use. Note that the number of software layers need not be the same as the number of physical probes, monitored system components, or intrinsic characteristics of the monitored system.

The monitoring and analysis system obtains the variable values and related values either directly or via the software layers 80 *a-n*. For example, these layers 80 can be interfaced to the physical probes or intermediate data collection systems. An optional Storage module 40 is used to store data from the intermediate software layers 80, sensors 38 *a-n*, and/or other data probes, if the analysis is not to be performed on a real-time basis, or if the data is to be kept for future consideration. Optional Storage module 40 is also used to store results from the monitoring and analysis system.

The intermediate software layers 80, sensors 38, or other data probes are connected to each other, where appropriate, to the monitoring and analysis system, and to the optional Storage module 40, by suitable communication links. The communication links may be, for example, electrical conductors, optical fibers, radio links, or other means. The software layers, sensors, and/or data probes transmit signals through the respective communication links indicative of the variables' conditions. These signals may be analog, digital, FSK, or other formats.

The variable values and analysis functionalities are described by a Bayesian Inference module 44 and an alarm condition module 46. In actual implementation, the functionalities of these pieces may overlap, but they are separated out here for clarity.

The Bayesian Inference module 44 uses Bayesian inference to probabilistically infer the values of parameters for provided abstract probabilistic model(s) 42 for the normal behaviors of the variables. The general form of an abstract probabilistic model 42 for the normal behaviors of the variables is either created by the user or picked by the monitoring and analysis system from a set of typical models based on a set of user imposed constraints. The resulting concrete probabilistic model(s) 48 includes the values of the parameters. If desired, given a set of fit constraints, a best-fit concrete probabilistic model can be selected by a user or by the monitoring and analysis system. The values of the parameters of the concrete probabilistic models 48 are determined by the Bayesian Inference module 44.

The method capitalizes on the fact that the monitored system is comprised of a statistically significant number of statistically similar devices. Thus we can assume departure from the expected distribution of the resultant variable values to be due to environmental effects. This same lack of randomness, if it exists, allows a model of these environmental effects to be developed.

Consider the following example. It is necessary to provide an abstract probabilistic model or models for which the parameter values will be inferred in order to produce the probabilistic model or models 48. While this is true for any number of variables, the example of the single variable of processor temperature in a monitored computational cluster is used for clarity. It is understood that this same process applies to variables other than temperature, and to one or more variables taken in conjunction; for example, temperature and fan speed, modeled together. In the example, the temperature of a processor on a node may be affected by such factors as the computational load on a processor, the rotational speed of the processor's cooling fan and the height of a processor in a rack. In the example, for a fixed computational load and fan speed, the major contribution to the temperature of a processor is its height, and all other factors can be captured in a noise term. For example, if a quadratic model is chosen for the dependency of the mean temperature on height, then the probabilistic model can be expressed as:

$$T \sim N(\mu(T), \sigma), \qquad \text{[Equation 1]}$$

wherein $$\mu(T) = ah^2 + bh + c, \qquad \text{[Equation 2]}$$

where h is height, and N is the normal distribution function, and wherein a, b, c, and $\sigma$ are the parameters of the model. Thus the probability of a node at a given height evincing a temperature T is expressed by a normal distribution about a mean where $\mu$ is expressed as a quadratic function of height. The quadratic function is used to capture the effects of height; the normal distribution function is used to capture the effects of other factors considered as noise. The values of the parameters a, b, c, and $\sigma$ will be inferred by the Bayesian Inference module 44.

The method uses repeated application of the well-known Bayes' theorem, which can be expressed as:

$$P(B|A) = P(A|B)P(B)/P(A), \qquad \text{[Equation 3]}$$

where P(B|A) is the probability of event B occurring given that event A has occurred, P(A|B) is the probability of event A occurring given that event B has occurred, P(B) is the probability of event B occurring, and P(A) is the probability of event A occurring.

Bayes' theorem applied to consideration of the model, its parameters and the data in the cluster processor temperature example given above (after some rearranging) results in:

$$P(X|D,M) = P(D|X,M)P(X|M)/P(D|M) \qquad \text{[Equation 4]}$$

where M is the abstract probabilistic model (e.g., temperature for each height is a Gaussian random variable whose mean is a quadratic function of height in the cluster), X is a set of abstract probabilistic model parameters whose values are to be inferred (e.g. a, b, c, and $\sigma$), and D is the data (e.g., the actual values of the variables that are evinced in the cluster).

The term P(X|D,M) in the above equation is known as the posterior and is the probability density function (PDF) of the model parameters given the data D and the model M.

The next term, P(D|X,M) is known as the likelihood, and is the probability density of the actual data as a function of the parameters X and model M.

The term P(X|M), which is known as the prior, is the PDF of the parameters X given the model M.

The final term P(D|M), is known as the evidence, and it is a normalization term calculated by summing the posteriors before normalization has occurred.

The goal of the Bayesian Inference module 44 is to probabilistically infer values X of the parameters which establish the concrete probabilistic model 48.

The preferred method for probabilistically inferring the values X of the parameters of the probabilistic model 48 is to explicitly calculate the posterior P(X|D,M) over the range of allowable values of X. Other ways to determine X include sampling from the posterior via Markov chain Monte Carlo (MCMC) simulation, computing posterior expectations via importance sampling, and other methods known in the art. The posterior is calculated using Bayes' theorem in an iterative manner in which the posterior from the previous calculation is used as the to prior for the next iteration. For the first calculation, the prior is obtained by some other means, such as by assuming a uniform PDF. The model parameters used at the start of the iterative process can be based on the variable data and expert knowledge, such as a mathematically expected description of variable behavior and physically reasonable value ranges. The calculation is repeated until the process converges to a predetermined convergence criterion. For example, the ratio of the current posterior maximum to the previous posterior maximum can be used as such a criterion. Once the calculation has converged, the probability distribution for the parameters is established.

The data, D, used by the Bayesian Inference module 44 is variable data from the system being monitored. It can be real-time data or that obtained from the optional Storage module 40. It can be a subset of the data being studied or training data.

While the probability distribution of the parameters does not enforce a choice of the parameters to be used, in practice, for a sufficiently peaked distribution, a good approximation to the entire space can be used by choosing the set of values X* of the parameters that yield the maximum value of P(X|D,M). The chosen parameter values X* are then part of the concrete probabilistic model, 48. The PDF of the concrete probabilistic model is P(D|X*) where the functional form of the PDF is given by M, the abstract probabilistic model.

As an example, if this method is applied to a particular instantiation of a computational cluster in a particular environment where processor temperature is the variable being monitored and, after application of the Bayesian Inference module 44 functionality to the data and the model form given in Equations 1 and 2, it may be, for example, that the parameter values are a=0.005 [°C./m$^2$], b=−0.1 [°C./m], c=23 [°C.] and σ=1.5 [°C.]. The resulting concrete probabilistic model 48 then consists of Equations 1 and 2 and the values of the parameters a, b, c, and σ as given above. The Bayesian module 44 may store the values for the parameters in the optional Storage module 40.

Using probabilistic model 48 and the evinced data of the monitored system, either directly or from storage, the alarm condition module 46 calculates relative probabilities of the variable values actually evinced in the monitored system. The alarm criteria, taking into consideration the relative probabilities and the probabilistic model, are used to determine if an alarm condition is met.

The term relative probability is used to refer to a numeric indication of where a particular value lies in the probability distribution for that variable. There is no standardized method for calculating this numeric indication, and hence using a different method may result in a different numeric result given the same variable value. For example, one possible method is to use the ratio of the value of the PDF of the concrete probabilistic model at the variable value evinced in the monitored system to the maximum value of the PDF of the concrete probabilistic model. Another option is to compare the variable's value to the quantiles of the concrete probabilistic model. These are not the only quantities that could be used, but are given as examples for clarity.

As an example, consider the processor temperature in a computational cluster example we have used above, including the abstract probabilistic model and its parameter values. A quantity representing the relative probability may be chosen as the ratio of the value of the PDF of the concrete probabilistic model at the variable value evinced in the monitored system to the maximum value of the PDF of the concrete probabilistic model. In this case then the relative probability of an evinced temperature of 23° C. is 95% whereas the relative probability of an evinced temperature of 25° C. is only 25%.

The probabilistic criteria for one or more alarms can be predefined limits (such as less than 5% relative probability) or ones that are calculated based upon the relative probabilities and the concrete probabilistic model 48 (e.g. the limit may be adjusted based upon the peakedness of the distribution).

As an example of the alarm criteria, one may choose to send an urgent alarm if a variable value has less than 5% relative probability, a warning if it is between 5% and 10% relative probability, and no alarm otherwise. This last condition, i.e., for a relative probability greater than 10%, is considered to be normal given the model and the parameters.

The relative probability of values evinced in the monitored system and any alarm conditions can be stored in the optional Storage module 40.

Diagnostic output, including the data values, the parameters of the current model or models, the probability of values evinced in the monitored system, and any alarm conditions may be presented through an interface 50. The interface 50 may include one or more means of signaling an alarm condition or providing information upon request. The interface may include an e-mail generator 54, a check-pointing directive transmitter 56, a database containing a textual alarm log 58, a scheduler directive transmitter 60, plot and/or visual displays 64, or a programmatic interface 65 that provides information upon request to name but a few. The check-pointing directive transmitter 56 is a device that sends a request to save a copy of the current state of the monitored system. In a computational cluster, this state is data that is available at the current calculation point which can be used to resume the calculation without starting over. As a result, if the computational node for which the alarm was generated malfunctions, the calculation can be re-started at the point where the malfunction occurred. The scheduler directive transmitter 60 is a device that sends notification of components of the monitored system for which an alarm condition exists. For the example of a computational cluster, the scheduler directive transmitter may notify the cluster scheduler of computational node(s) for which an alarm condition is met. The scheduler may to then explicitly not allocate the effected nodes for subsequent calculations.

Figure 2:
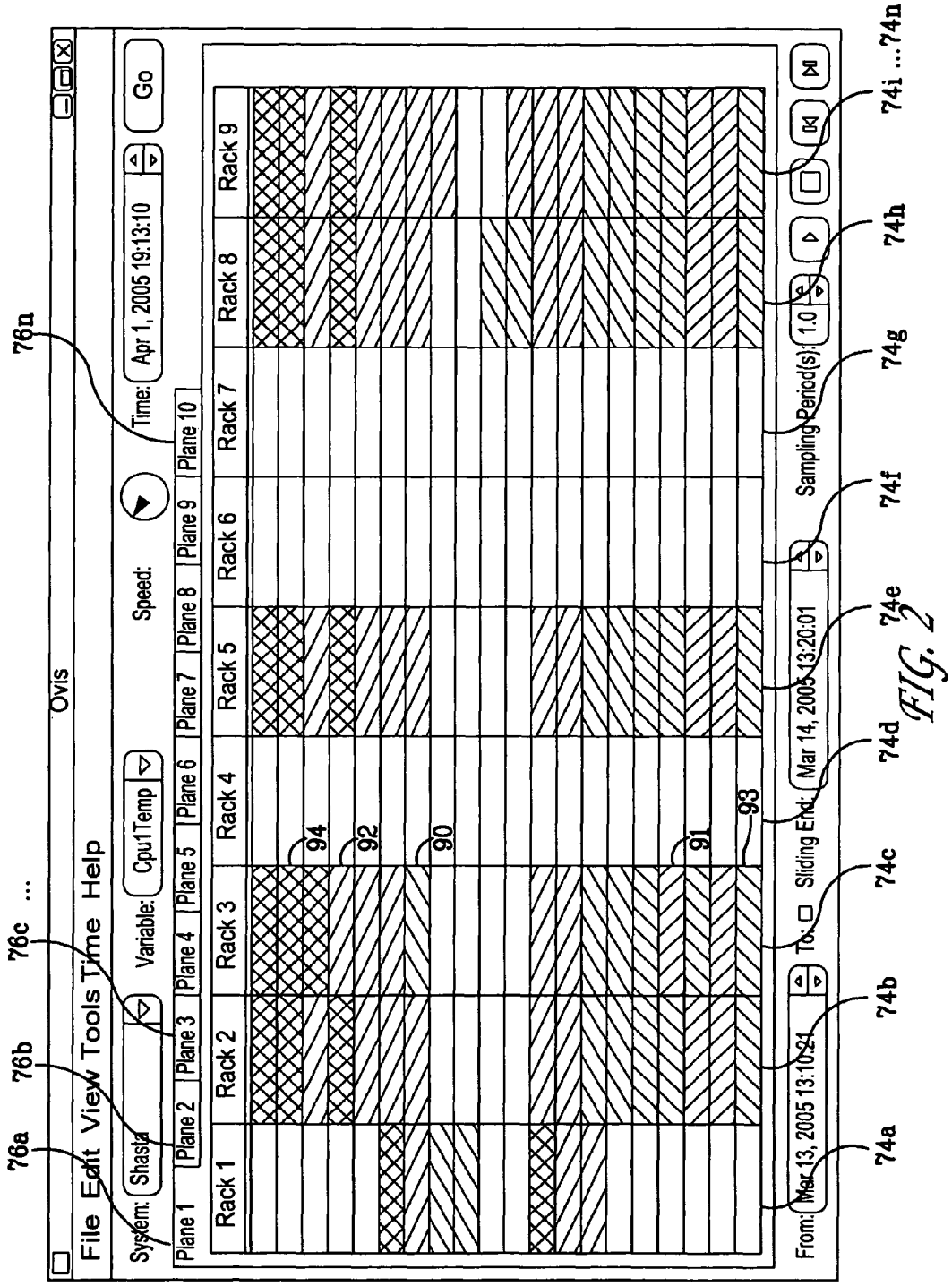
FIG. 2 is a screen shot showing one example of a user interface for the monitoring and analysis systems of FIG. 1.

An example of diagnostic output obtained using the monitoring and analysis system of FIG. 1 is shown in FIG. 2. The diagnostic output is in the form of a screen shot of a visual display 46 representing the monitored nodes of a computational cluster, laid out in a diagram representative of their actual layout. Each node is represented by a cross-hatched rectangle, with racks containing the nodes comprising each column. Blank rectangles indicate spaces in the cluster where no node exists. If more nodes and racks exist than can be easily viewed on one screen, they are shown on additional planes of display, hidden behind the first (labeled, but not shown in this figure). FIG. 2 shows 81 nodes (cross-hatched rectangles), spread in 7 racks, laid out in columns 74 *a-c, e*, and *h-i*, shown on Plane 1 which is the first tabbed display 76*a*, of tabs 76 *a-n* in FIG. 2. The cross-hatched pattern displayed in the rectangles provide indications of both the relative probability of the corresponding computational node evincing the variable value indicated by the respective physical probes 38 from FIG. 1 and of the relative value of the variable value as well. Coloring, texturing, shading, or other alternative markings are also options for indicators, but are not shown in this example screenshot. Nodes whose variable values have greater than or equal to, for example, 63% relative probability to be at that value are shown with a cross-hatched pattern whose density is in the middle of the range of the cross-hatched patterns used. An example of this is shown in the rectangle marked 90. These values can be considered normal and do not indicate an alarm. Nodes whose variable values have less than a 63% relative probability are then shown with other patterns. Those that have less than 63% relative probability by virtue of having values less than the most probable value are shown with less dense cross-hatched patterns; those that have less than 63% relative probability by virtue of having values greater than the most probable value are shown with more dense cross-hatched patterns. In this example, 2 levels of less-dense patterns and 2 levels of more dense patterns are shown, indicating various levels of relative probability ranges, and hence alarm conditions. For example, nodes whose variable values have between 5% and 63% relative probability of being at that value are rectangles 91 and 92, with those nodes exhibiting values less than and greater than the most probable value, respectively. The patterns in rectangles 91 and 92 can be considered cautionary alarm conditions. Examples of nodes whose variable values have less than 5% relative probability of being at that value are rectangles 93 and 94, with those nodes exhibiting values less than and greater than the most probable value, respectively. These nodes are cross-hatched with the least and most dense patterns, respectively. These can be considered urgent alarm conditions. Other means of providing diagnostic output will be apparent to one skilled in the art.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A method for monitoring and analyzing an electronic system for one or more alarm conditions, comprising:
   receiving values of one or more attributes evinced in the electronic system, wherein the electronic system comprises a collection of a statistically significant number of statistically similar components;
   providing one or more abstract probabilistic models for modeling a set V of the one or more attribute values, wherein the one or more abstract probabilistic models include one or more parameters each having a numeric value;
   probabilistically inferring the numeric values of the one or more parameters for each of the one or more abstract probabilistic models modeling the set V through an iterative process comprising a variable number of Bayesian inference iterations until the iterative process converges to a predetermined convergence criterion, wherein each of the one or more abstract probabilistic models when combined with a single inferred number for each of the parameters is defined as a concrete probabilistic model;
   determining relative probabilities of at least some of the one or more attributes evinced in the electronic system;
   providing criteria for one or more alarm conditions based upon the relative probabilities of the at least some of the attributes evinced in the electronic system;
   determining whether any of the one or more alarm conditions are met; and
   providing a signal and information identifying which of the one or more alarm conditions are met.

2. The method of claim 1, wherein the attribute values evinced in the system are selected from the list consisting of:
   attributes monitored for alarm conditions;
   intrinsic characteristics of the system;
   intrinsic characteristics of the statistically similar components;
   attributes monitored for alarm conditions processed by software;
   intrinsic characteristics of the system processed by software;
   intrinsic characteristics of the statistically similar components processed by software; and
   combinations thereof.

3. The method of claim 1, wherein the step of providing information identifying which of the one or more alarm conditions are met is performed in a manner selected from the list consisting of:
   in response to external requests;
   at regular intervals in time;
   when an alarm condition has changed; and
   combinations thereof.

4. The method of claim 1, wherein the step of providing one or more abstract probabilistic models is selected from the list consisting of:
   providing models generated by a user;
   providing models selected from a set of typical models based on a set of imposed constraints; and
   combinations thereof.

5. The method of claim 1, wherein the one or more concrete probabilistic models for modeling the set V are expressed as corresponding probability density functions (PDF).

6. The method of claim 1, wherein the attribute values evinced in the system are obtained from sensors.

7. The method of claim 1, wherein the one or more concrete probabilistic models can be described by any random variable or combination of random variables dependent on the inferred parameter values.

8. The method of claim 1, wherein the step of probabilistically inferring the parameter values further comprises selecting the most likely values of the parameters.

9. The method of claim 1, wherein the step of probabilistically inferring the parameter values of the one or more concrete probabilistic models further comprises providing probability density functions of the one or more inferred concrete probabilistic models.

10. The method of claim 1, wherein the step of providing the one or more abstract probabilistic models further includes the effects of environmental conditions to which the statistically similar components are exposed.

11. The method of claim 1, wherein the step of providing criteria further includes compensating for environmental conditions to which the statistically similar components are exposed.

12. The method of claim 1, wherein the one or more concrete probabilistic models are used to determine the relative probabilities of at least some of the attribute values.

13. The method of claim 1, wherein the criteria for the one or more alarm conditions are externally provided.

14. The method of claim 1, wherein the relative probabilities of the attribute values evinced in the system are used to generate the criteria for the one of more alarm conditions.

15. The method of claim 1, wherein the step of providing information identifying which of the one or more alarm conditions are met comprises a visual display, the display including a visual representation of the components in at least a part of the collection of statistically similar components, the display being operable to change the appearance of the visual representation of the collection of components when an alarm condition changes.

16. The method of claim 3, wherein the information provided when an alarm condition has changed comprises signaling an alarm and/or initiating an automated response to the alarm condition.

17. The method of claim 5, wherein the step of determining the relative probabilities of at least some of the attribute values evinced in the system includes computing the ratios of the values of the PDF at the attribute values evinced in the system to the maximum value of the PDF for each of the one or more concrete probabilistic models.

18. The method of claim 12, wherein the step of determining the relative probabilities of at least some of the attribute values includes providing a numeric indication of where each value is located in a corresponding probability distribution as implied by the one or more concrete probabilistic models.

19. The method of claim 16, wherein the step of initiating an automated response to the alarm condition comprises transmitting a checkpoint directive.

20. The method of claim 16, wherein the step of initiating an automated response to the alarm condition comprises transmitting a scheduler directive.

21. The method of claim 5, wherein the step of determining the relative probabilities of at least some of the attribute values evinced in the system includes a quantile of any of the one or more concrete probabilistic models containing the attribute corresponding to the attribute value.

* * * * *